(No Model.)

G. M. HOPKINS.
GAS ENGINE.

No. 284,556.  Patented Sept. 4, 1883.

WITNESSES:
C. Neveux
C. Sedgwick

INVENTOR:
G. M. Hopkins
BY Munn & Co
ATTORNEYS.

UNITED STATES PATENT OFFICE.

GEORGE M. HOPKINS, OF BROOKLYN, ASSIGNOR TO THE ECONOMIC MOTOR COMPANY, OF NEW YORK, N. Y.

GAS-ENGINE.

SPECIFICATION forming part of Letters Patent No. 284,556, dated September 4, 1883.

Application filed March 31, 1883. (No model.)

*To all whom it may concern:*

Be it known that I, GEORGE M. HOPKINS, of Brooklyn, in the county of Kings and State of New York, have invented a new and Improved Gas-Engine, of which the following is a full, clear, and exact description.

My invention relates to the class of gas-engines in which a mixture of gas and common air is drawn into the cylinder during the early part of the stroke of the piston and then exploded for the purpose of propelling the piston to the end of its stroke; and it consists in a combination of a check-valve with the supply-tube leading from the gas and air valves for preventing the heat resulting from the explosion in the cylinder from heating the gas and air check-valves.

Figure 1:
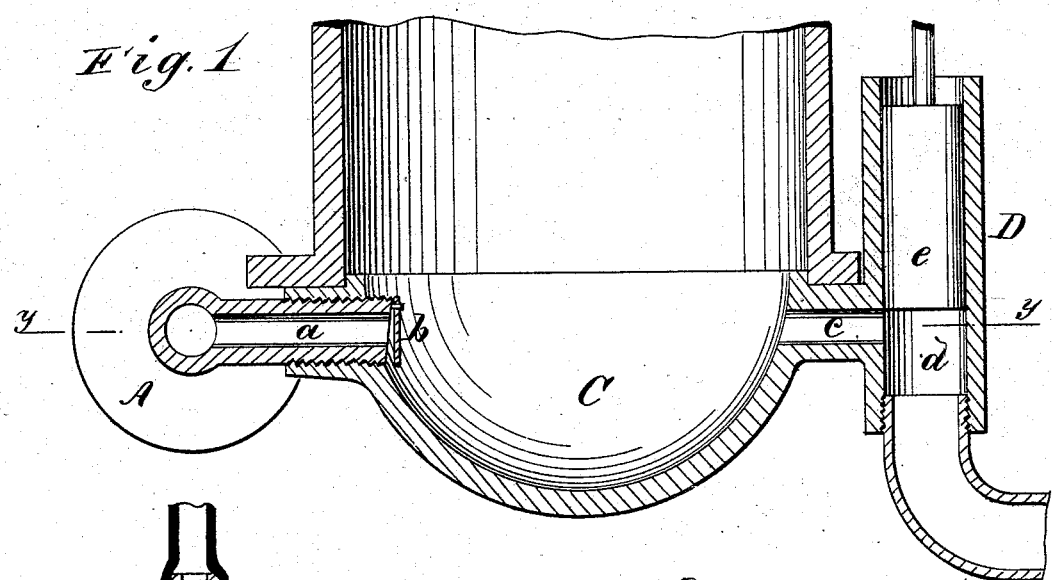
Figure 2:
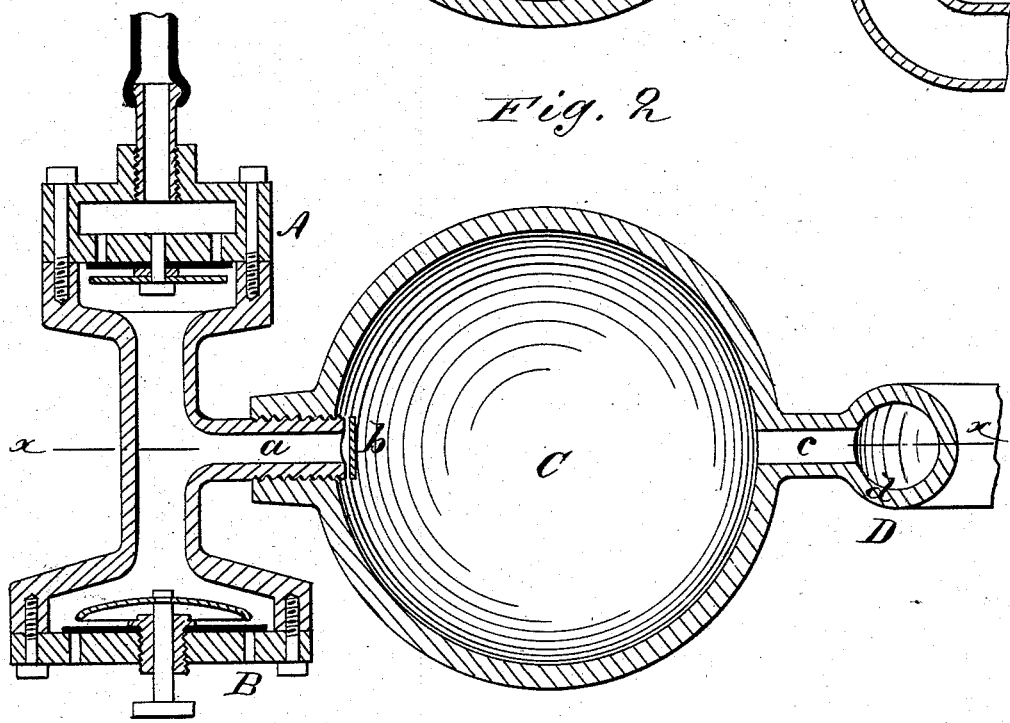

Figure 1 is a vertical section taken on the line *x x* in Fig. 2. Fig. 2 is a horizontal section taken on line *y y* in Fig. 1.

Like letters of reference indicate the same parts in the two figures of the drawings.

In my improved gas-engine the gas check-valve A and air check-valve B are similar in construction, each consisting of a rubber disk opening inward and closing upon a metal plate having a circular row of holes, which the rubber valve closes when seated. The gas check-valve A and air check-valve B communicate with the cylinder-bottom C by means of the supply-tube *a*, which may be screwed into the cylinder-bottom or cast integral therewith. On the inner end of the tube *a*, and within the cylinder-bottom, there is a flap-valve, *b*, which hangs loosely on its supporting-screw. The inner end of the tube *a* is beveled or undercut, so that the valve *b* is normally open. At the opposite side of the cylinder-bottom a tube, *c*, communicates with an exhaust-valve, D, consisting of a cylindrical valve-casing, *d*, and a cylindrical slide-valve, *e*, which is operated by an eccentric on the main shaft of the engine. The gas and air are drawn into the cylinder by the rising of the piston therein until the explosion takes place, when the flap-valve *b* closes and prevents the flame and heated gases from reaching the gas and air valves. After the piston reaches the extreme outward limit of its stroke the exhaust-valve opens and allows the products of combustion to escape during the return-stroke of the piston.

Having thus described my invention, I claim as new and desire to secure by Letters Patent—

1. In a gas-engine, the combination of the normally-open flap-valve *b* with the supply-tube *a*, leading from the gas and air valves, as herein specified.

2. In a gas-engine, the combination of the gas-valve A and air-valve B, disconnected and acting independently, and the normally-open flap-valve *b*, in combination, as herein specified.

3. In a gas-engine, the combination of the gas-valve A and air-valve B, disconnected and acting independently, the normally-open flap-valve *b*, and exhaust-valve D, as herein specified.

GEO. M. HOPKINS.

Witnesses:
B. G. UNDERWOOD,
C. SEDGWICK.